United States Patent [19]

Baxter et al.

[11] Patent Number: 5,118,737
[45] Date of Patent: Jun. 2, 1992

[54] WATER-SOLUBLE DYE

[75] Inventors: Anthony G. W. Baxter, Manchester; Stephen B. Bostock, Bury; David Greenwood, Oldham, all of England

[73] Assignee: Canon Kabushiki Kaisha, Tokyo, Japan

[21] Appl. No.: 541,077

[22] Filed: Jun. 22, 1990

Related U.S. Application Data

[60] Continuation of Ser. No. 195,396, May 12, 1988, abandoned, which is a continuation of Ser. No. 932,303, Nov. 19, 1986, abandoned, which is a division of Ser. No. 764,999, Aug. 12, 1985, abandoned.

[30] Foreign Application Priority Data

Aug. 24, 1984 [GB] United Kingdom ............ 8421551

[51] Int. Cl.$^5$ .............. C08K 5/34; C09D 11/00; C09B 29/00
[52] U.S. Cl. ............... 524/100; 106/22; 260/DIG. 38; 534/598; 534/604; 534/637; 534/728; 534/738; 534/754; 534/755; 534/793; 534/825; 534/831; 534/836; 534/840; 534/876; 534/887
[58] Field of Search ........ 524/100; 106/22; 260/DIG. 38; 534/598, 604, 637, 728, 738, 754, 755, 753, 829, 831, 836, 840, 876, 887

[56] References Cited

U.S. PATENT DOCUMENTS 3,072,454 1/1963 Long et al. ............ 534/797
4,083,840 4/1978 Schoefberger ......... 534/797

FOREIGN PATENT DOCUMENTS 609084 2/1979 Switzerland ......... 534/797

*Primary Examiner*—Joseph L. Schofer
*Assistant Examiner*—Peter Mulcahy
*Attorney, Agent, or Firm*—Cushman, Darby & Cushman

[57] ABSTRACT

A water-soluble dye, free from cellulose reactive groups, of the formula:

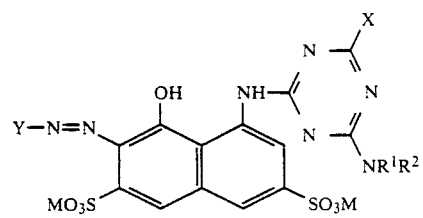

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
M is H, ammonium, or a monovalent metal;
X (i) $NR^1R^2$, (ii) $NR^3R^4$, in which $R^3$ and $R^4$ are each independently selected from H, alkyl and aryl, or (iii) the residue of a mono- or bis-azo chromophore comprising benzene, naphthalene or mono- or bi-cyclic heteroaryl diazo and coupling components linked to the triazine nucleus through an amino linking group;
and Y is (i) the residue of a benzene, naphthalene or mono or bi-cyclic heteroaryl diazo component or (ii) the residue of a mono- or bis-azo chromophore carrying a diazotisable amino group and comprising benzene, naphthalene or mono-or bi-cyclic heteroaryl diazo and coupling components;
provided that the dye contains one or at least three azo groups and an ink derived from the dye which is suitable for use in printing, especially ink jet printing.

15 Claims, 1 Drawing Sheet

U.S. Patent June 2, 1992 5,118,737
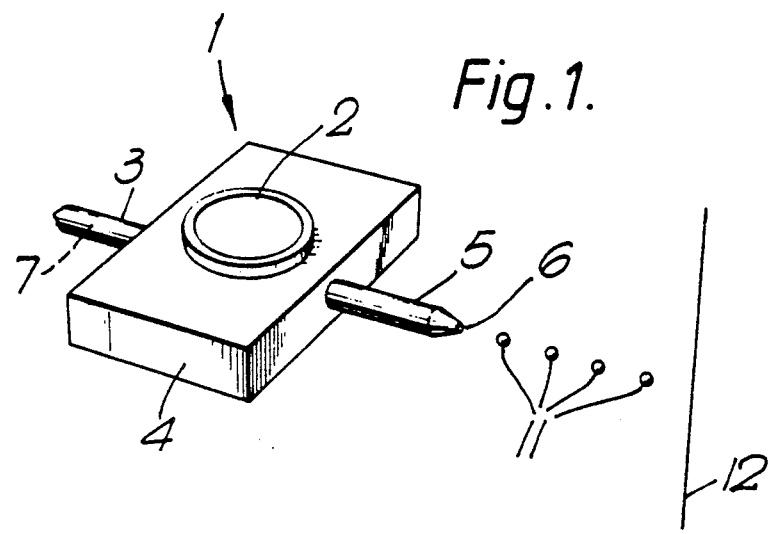
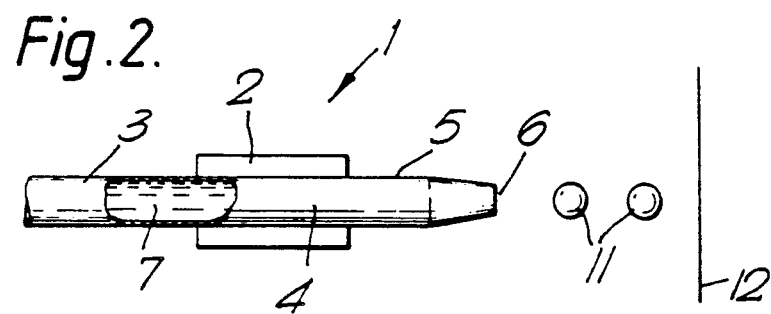
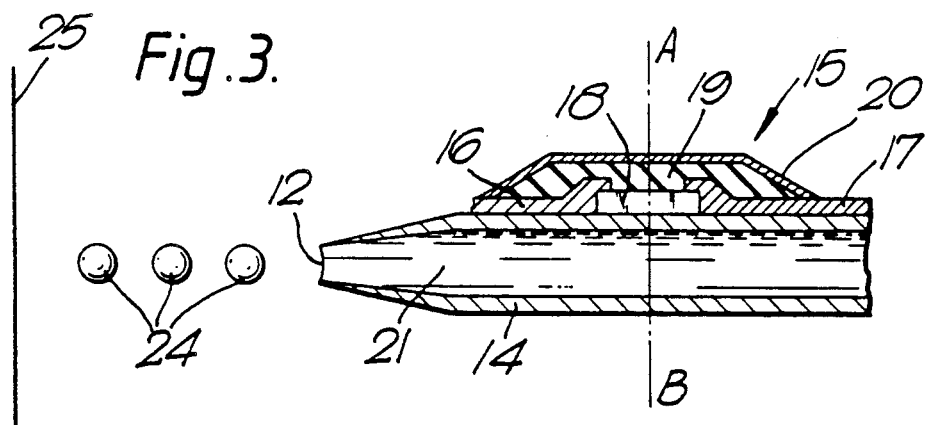
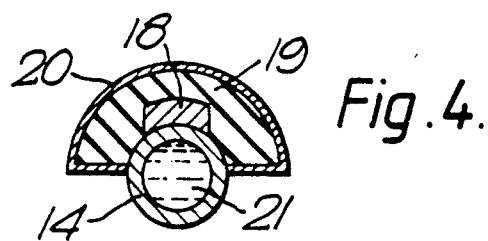

WATER-SOLUBLE DYE

This is a continuation of application Ser. No. 07/195,396, filed on May 12, 1988, which was abandoned upon the filing hereof, which in turn is a continuation of application Ser. No. 06/932,303, filed Nov. 19, 1986, now abandoned, which in turn is a divisional of application Ser. No. 06/764,999, filed Aug. 12, 1985, now abandoned.

This specification describes an invention relating to a water-soluble dye and to an ink containing the dye which is suitable for use in ink jet printing.

THE DYE

According to the present invention there is provided a water-soluble dye, free from cellulose reactive groups, of the formula:

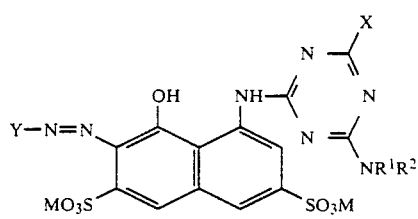

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
M is H, ammonium, or a monovalent metal;
X (i) $NR^1R^2$, (ii) $NR^3R^4$, in which $R^3$ and $R^4$ are each independently selected from H, alkyl and aryl, or (iii) the residue of a mono- or bis-azo chromophore comprising benzene, naphthalene or mono- or bi-cyclic heteroaryl diazo and coupling components linked to the triazine nucleus through an amino linking group;
and Y is (i) the residue of a benzene or naphthalene diazo component or (ii) the residue of a mono- or bis-azo chromophore carrying a diazotisable amino group and comprising a benzene, naphthalene or mono- or bi-cyclic heteroaryl diazo coupling components;
provided that the dye contains one, or at least three, azo groups.

If the dye contains more than one $-(C_aH_{2a}O)_m(C_bH_{2b}O)_nH$ group these may be different, but are preferably identical. It is preferred that, in the group $NR^1R^2$, a & b are from 2 to 6 and more Preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)propyl. It especially preferred that $R^1$ is hydroxyethyl and $R^2$ is H; $R^1$ and $R^2$ are both hydroxyethyl or $NR^1R^2$ is morpholino.

Where Y is the residue of a benzene, naphthalene or diazo component, it is preferably a phenyl or naphthalene nucleus carrying at least one sulphonic acid group, $SO_3M$, and optionally carrying other substituents. Examples of other substituents are $C_{1-4}$-alkyl, $C_{1-4}$-alkoxy, mono- or di-$C_{14}$-alkylamino, $C_{1-4}$-alkylcarbonylamino, unsubstituted and mono- and di-alkyl-amino-sulphonyl and carbonyl, ureido, phenylamino, nitro, halogen, especially chlorine, and hydroxy. Where Y is the residue of a mono- or bis-azo chromophore carrying a diazotisable amino group and comprising benzene, naphthalene or mono- or bi-cyclic heteroaryl diazo and coupling components, it is preferably the residue of a monoazo dye, comprising a benzene, naphthalene or heterocyclic, especially mono-heterocyclic, diazo component and a benzene or naphthalene coupling component, carrying at least one, and more preferably two, sulphonic acid group and optionally carrying other substituents, examples of which are given above for Y.

Examples of groups represented by Y are 2-sulpho-4-methoxyphen-1-yl, 2-sulpho-4-methylphen-1-yl, 2-methyl-4-sulphophen-1-yl, 4-sulphophen-1-yl, 3,6,8-trisulphonaphth-2-yl, 2,5-disulphophen-1-yl, 2-methoxy-4-(2,5-disulphophenylazo)-5-methylphen-1-yl, 2-methoxy-4-(2-sulpho-4-nitrophenylazo)-5-methylphen-1-yl, 4-(thiazol-2-ylazo)-2,5-disulphophen-1-yl, 4-(4-chloro-2,5-disulphophen-1-ylazo)- 2,5-dimethylphen-1-yl, 4-(2,5-disulphophenylazo)-2,5-dimethylphen-1-yl.

Where X is $NR^3R^4$, $R^3$ is preferably H or $C_{1-4}$-alkyl and $R^4$ is preferably H, $C_{1-4}$-alkyl, mono- or bi-cyclic aryl or mono- or bi-cyclic heteroaryl. Where $R^4$ is aryl, it is preferably a phenyl or naphthyl radical carrying at least one sulphonic acid group, $SO_3M$, and optionally carrying other substituents selected from those exemplified above for Y.

The amine linking group in X may be of the general formula $-NR^5-$ in which $R^5$ is preferably H, $C_{1-4}$-alkyl or phenyl, and especially preferably H or $CH_3$.

The residue of a monoazo chromophore represented by X is preferably based upon a benzene or naphthalene diazo component and a benzene, naphthalene or monoheterocyclic coupling components and the residue of the diazo chromophore is preferably based upon benzene and/or naphthalene diazo and coupling components. In both cases the chromophore preferably carries at least one, and more preferably two, sulphonic acid group and optionally carries other substituents such as those exemplified above for Y. Examples of groups represented by X are 5-hydroxy-6-(2-sulphophenylazo)-7-sulpho-naphth-2-ylimino, 2-methyl-4-(2,5-disulphophenylazo)phen-1-ylimino, 6-sulpho-7-(3,6,8-trisulphonaphth-2-ylazo)-8-hydroxynaphth-2-ylimino, 3-ureido-4-(2,5-dimethyl4-[2,5-disulphophenylazo]-phenylazo)phen-1-ylimino, 3-acetylamino-4-(2,5-dimethyl-4-[2,5-disulphophenylazo]phenyl-azo)-phen-1-ylimino and 3-sulpho-4-(1-[4-sulphophenyl]-3-carboxypyrazolin-5-on-4-ylazo)-phenylimino.

A first preferred class of dye of Formula I contains from three to five, more preferably three or four, azo groups and in this class it is preferred that X and Y are, each independently, residues of mono- or bis-azo chromophores. The dyes of the first class are generally dark blue or black in shade, have generally good solubility and fastness properties and are adapted for use in inks suitable for droplet printing. A second preferred class of dye of Formula I contains a single azo group and in this class it is preferred that Y is the residue of a benzene or naphthalene diazo component and X is $NR^1R^2$ or a phenylimino group carrying at least one sulphonate group. The dyes of the second preferred class are generally magenta in shade, have generally good solubility and fastness properties and are adapted for use in inks suitable for droplet printing.

Water-solubility is enhanced by the presence of acid groups such as carboxylic acid and sulphonic acid groups and also by groups represented by $NR^1R^2$, especially where $R^1$ and/or $R^2$ is hydroxyethyl or $NR^1R^2$ is morpholino. It is preferred that the dye carries at least five, and more preferably at least six, such water-solubilising groups. However, sulphonic acid groups are generally superior to carboxylic acid groups at confering water-solubility and it is preferred that each azo chromophore carries at least two, and more preferably at least three, sulphonic acid groups and that the whole molecule carries at least five and more preferably at least six sulphonic acid groups.

The species M, associated with the sulphonic acid groups, may be any monovalent cation which forms a stable water-soluble salt with the dye and is preferably ammonium, including substituted ammonium, e.g. mono-, di, tri- or quaternary- alkylammonium or substituted-alkylammonium, or an alkali metal, such as sodium, potassium or lithium Examples of especially preferred water-soluble dyes are the following acid dyes:

Dye 1. A dye of Formula I wherein $R^1$ is hydroxyethyl $R^2$ is H, M is potassium, Y is 2-methoxy-4-(2,5-disulphophenylazo)-5-methylphen-1-yl and X is 5-hydroxy-6-(2-sulphophenylazo)-7-sulphonaphth-2-ylimino as the potassium salt.

Dye 2. A dye of Formula I wherein M, $R^1$, $R^2$ and Y are as in Dye 1 and X is 3-ureido-4-(2,5-dimethyl-4-[2,5-disulphophenylazo]-phenylazo)phen-1-ylimino as the potassium salt.

Dye 3. A dye of Formula I wherein M, $R^1$, $R^2$ and Y are as defined in Dye 1 and X is 2-methoxy-4-(2,5-disulphophenylazo)phen-1-ylimino as the potassium salt.

Dye 4. A dye of Formula I wherein M, $R^1$, $R^2$ and Y are as defined in Dye 1 and X is 6-sulpho-7-(3,6,8-trisulphonaphth-2-ylazo)-8-hydroxynaphth-2-ylimino as the potassium salt.

Dye 5. A dye of Formula I wherein M is sodium, $R^1$ is 6-hydroxy-n-hexyl, $R^2$ is H, X is 3-sulpho-4-(1-[4-sulphophenyl]-3-carboxy-pyrazolin-5-on-4-ylazo)-phenylimino and Y is 2,5-dimethyl-4-(2,5-disulphophenylazo)-phen-1-yl, both as the sodium salt.

Dye 6. A dye of Formula I wherein M, X and Y are as in Dye 5 and $R^1$ and $R^2$ are both hydroxyethyl.

Dye 7. A dye of Formula I wherein X and Y are as in Dye 5, $NR^1R^2$ is morpholino and M is tri(hydroxyethyl)ammonium.

Dye 8. A dye of Formula I wherein X and Y are as in Dye 5, $R^1$ is 3-(2-hydroxyethoxy)propyl, $R^2$ is H and M is potassium.

Dye 9. A dye of Formula I wherein $R^1$, $R^2$ and Y are as in Dye 2, and X is 3-acetylamino-4-(2,5-dimethyl-4-[2,5-disulphophenylazo]-phenylazo)-phen-1-ylimino, as the potassium salt.

Dye 10. A dye of Formula I wherein $R^1$, $R^2$ and X are as in Dye 5, M is ammonium and Y is 2,5-dimethyl-4-(thiazol-2-ylazo)-phen-1-yl, as the ammonium salt.

Dye 11. A dye of Formula I wherein $R^1$, $R^2$ and X are as in Dye 10 and Y is 4-(4-chloro-2,5-disulphophen-1-ylazo)-2,5-dimethyl-phen-1-yl, as the ammonium salt.

Dye 12. A dye of Formula I in which $R^1$, $R^2$ and X are as in Dye 1 and Y is 2-methoxy- 4-(2-sulpho-4-nitrophenylazo)-5-methylphen-1-yl, as the potassium salt.

Dye 13. A dye of Formula I in which $R^1$ is hydroxyethyl, $R^2$ is H, X is 3-sulphophenylimino, Y is 2-methoxy-5-methyl-4-(4-[2,5-disulpho-4-acetylaminophenylazo]-6-sulphonaphth-1-ylazo)-phenyl, both as sodium salt and M is sodium.

Dye 14. A dye of Formula I in which $R^1$ is hydroxyethyl, $R^2$ is H, X is 5-hydroxy-6-(2-sulphophenylazo)-7-sulphonaphth-2-ylimino, Y is 2-methoxy-4-(2-sulpho-4-methylaminophenylazo)-5-methylphenyl, both as lithium salt and M is lithium.

Dye 15. A dye of Formula I in which $R^1$ is hydroxyethyl, $R^2$ is H, X is $NR^1R^2$ and Y Is 3,6,8-trisulphonaphth-2-yl (Na salt) and M is sodium.

Dye 16. A dye of Formula I in which $R^1$, $R^2$, X and M are as in Dye 15 and Y is 2-sulpho-4-methoxyphenyl.

Dye 17. A dye of Formula I in which $R^1$, $R^2$, X and M are as in Dye 15 and Y is 2-sulpho-4-methylphenyl.

Dye 18. A dye of Formula I in which $R^1$, $R^2$, X and M are as in Dye 15 and Y is 2-methyl-4-sulphophenyl.

Dye 19. A dye of Formula I in which $R^1$ & $R^2$ are as in Dye 15, M is ammonium, X is 3-sulphophenylimino and Y is 2-sulpho-4-nitrophenyl.

PREPARATION OF THE DYE

The dye of Formula I may be prepared by (i) diazotising a compound $Y-NH_2$, coupling this to H acid under alkaline conditions, (ii) reacting the resultant dye with cyanuric chloride under conditions such that one chlorine atom of the triazine is displaced by Y, (iii) reacting the mono-substituted triazine with a compound X—H, under conditions such that a second atom of chlorine is replaced by X and (iv) reacting the di-substituted triazine with $HNR^1R^2$ under conditions such that the third chlorine atom is replaced by $NR^1R^2$

BRIEF DESCRIPTION OF THE DRAWINGS

The present invention is further disclosed by the Figures which are briefly described as follows:

FIG. 1 shows an ink-jet printing device which operates by providing a printing signal at the print head section having a piezoelectric oscillator and generating ink droplets corresponding to the signal;

FIG. 2 shows a second ink-jet printing device using the same system as the device shown in FIG. 1;

FIG. 3 is a cross-sectional view of a tube employed in a print head of an ink-jet printing device; and FIG. 4 is a cross-sectional view taken on the line A–B in FIG. 3.

The present invention in so far as it relates to dyes is further illustrated with reference to the following Examples in which all parts and percentages are by weight, unless otherwise indicated.

EXAMPLE 1

Stage 1

A solution was prepared by mixing 25.3 g aniline-2,5-disulphonic acid (0.1M) with 125 g water and sufficient of a 32% aqueous solution of sodium hydroxide to give a neutral solution. The mixture was then stirred with 7.25 g sodium nitrite and the resultant solution added to 20 g 36% hydrochloric acid and 50 g ice over 10 minutes with suitable agitation. The resultant suspension was held at 15°–20° C. for 15 minutes after which 10% sulphamic acid solution was added to remove excess nitrous acid and 20% sodium carbonate solution to raise the pH to 4.0–4.5.

A solution of 13.7 g cresidine (0.1M) in 50 g water and 8.7 g 36% hydrochloric acid (8.7 parts) was prepared at 60° C. The solution was added slowly to a mixture of 125 g water, 20 g sodium acetate and 40 g ice at <10° C.

The diazo compound prepared above was added to the suspension of cresidine over 15 minutes at <10° C. The suspension was stirred 18 hours and the product collected by filtration, washed with saturated sodium chloride solution and dried at 40° C. to give 85 g (0.092 moles, yield 92.15%) of the amino-azo dye 2-methoxy-4-(2,5-disulphophenylazo)-5-methylaniline.

Stage 2

A solution of 92.3 g of the amino-azo dye from Stage 1 (0.1M) in 250 g water at pH 7.5-8.0 was prepared and 52.5 g 2N sodium nitrite solution (0.105M) was added. The resulting solution was added to 50 g 36% hydrochloric acid and 250 g ice over 15 minutes at 0°-5° C. and the mixture stirred for 15 minutes after which excess nitrous acid was removed by the addition of 10% sulphamic acid solution.

The solution of the diazotised amino-azo dye was then added, at <10° C., over 20 minutes to a solution of 36.1 g of acetyl-H-acid (0.11M) in 300 g water. At the same time 170 g of 8% sodium hydroxide solution was added dropwise to the reaction to maintain the pH value at 7.5-8.5. The coupling mixture was stirred 1 hour at 0°-5° C. after which 310 g salt was added, followed by 36% hydrochloric acid to maintain a pH of 2.0 and to precipitate the product. The disazo dye was collected by filtration, washed with a 25% sodium chloride solution and dried. The dry product was added to 1000 g 8% sodium hydroxide solution and the mixture heated to 70°-80° C. for 6 hours. The solution was cooled to 40° C., 36% hydrochloric acid added to a pH value of 7.0 followed by 250 g salt (25% w/v) to precipitate the dye. This was collected by filtration and washed with 25% sodium chloride solution. The 381 g filter paste contained 62.5 g (0.089 moles), yield=76.5%) of the disazo-amino dye 1-amino-3,6-disulpho-7-[2-methoxy-4-(2,5-disulphophenylazo)-5-methylphenyl-azo]-8-hydroxy-naphthalene.

Stage 3

To a solution of 49.85 g of the disazo dye from Stage 2 (0.01M) in 100 g water at 0°-2° C. was added evenly a solution of 3.7 g cyanuric chloride in 30 g acetone with rapid agitation. The pH was maintained at 5-6 by the addition of 8% sodium hydroxide solution and the reaction was complete in 1 hour. The solution was screened and a neutral solution of 2.39 g J-Acid (0.01M) in 100 g water was added. This solution was warmed to 35° C. over 1 hour and this temperature maintained a further 1 hour. At the same time a pH value of 6.0-6.5 was maintained by the addition of 8% sodium hydroxide solution. The reaction was tested for completion by thin-layer chromatography.

To the solution was added 6 g ethanolamine and this was then heated to 50°-55° C. for 7 hours. The reaction mixture was cooled to room temperature and 150 g salt (25% w/v) added to precipitate the dye. The product was collected by filtration and washed with 25% sodium chloride solution to give 38.5 g paste containing the dye (0.00715M) of Formula I (yield=71.5%) wherein $R^1$ is hydroxyethyl, $R^2$ is H, Y is 2-methoxy-4-(2,5-disulphophenylazo)-5-methylphen-1-yl and X is 5-hydroxy-7-sulphonaphth-2-ylamino as the potassium salt.

Stage 4

A solution of 1.73 g orthanilic acid (0.01M) in 100 g water at pH 8.0 was prepared, using 8% sodium hydroxide solution. To this solution was added 5.25 g of 2N sodium nitrite solution and the whole cooled to 0°-5° C. To this was then added 5 g of 36% hydrochloric acid and excess nitrous acid maintained for 30 minutes at 0°-5° C. Excess nitrous acid was then removed by the addition of 10% sulphamic acid.

A solution of 53.9 g of the dye produced in Stage 3 (0.01M) in 125 g water was prepared and cooled to 0°-5° C. The diazotised orthanilic acid solution described above was added over 15 minutes at 0°-5° C. and the pH maintained at 7.5-8.5 by the addition of 20 g 8% sodium hydroxide solution. The solution was stirred to room temperature and 46 g anhydrous potassium acetate added and dissolved on further agitation. The dye was then precipitated by the addition filtration, washed with 160 g ethanol/water (3:1 v/v) and then 160 g ethanol. After drying at 40° C., the solid was redissolved in 115 g distilled water and subjected to dialysis. The resulting solution, free from inorganic compounds, was evaporated to dryness at 50°-60° C. in vacuum to yield 11.5 g of the dye hereinbefore identified as Dye 1, i.e. the dye of Formula I wherein $R^1$ is hydroxyethyl, $R^2$ is H, Y is 2-methoxy-4-(2,5-disulphophenylazo)-5-methylphen-1-yl and X is 5-hydroxy-6-(2-sulphophenylazo)-7-sulphonaphth-2-ylamino as the potassium salt.

EXAMPLE 2

Stage 1

A solution of H-acid (30.1 g, 0.08M, MI=376) was prepared in water (150 cm$^3$) and sodium hydroxide at pH 6.5. To this solution was added ice (50 g) followed by a solution of cyanuric chloride (15.3 g, 0.082M) in acetone (100 cm$^3$) and the temperature maintained at below 2° C. with the addition of ice. The mixture was stirred for 3 hours at this temperature, pH 1.0. The solution was screened to remove a small amount of insoluble material.

Stage 2

The yellow-brown disazo-amino dyestuff, 3-ureido 4-(4-[2,5-disulphophenylazo]-2,5-dimethylphenylazo)-aniline (112.6 g paste, 0.04M) was added to water (300 cm$^3$) and 8% sodium hydroxide solution (20 cm$^3$) and the mixture stirred to obtain a solution. The solution of 'dichlorotriazinyl H-acid' from Stage 1 was then added in aliquots (0.01M) evenly over 3 hours at pH 6.0-6.5 and the temperature during this time raised to 30°-35° C. The reaction mixture was held a further 15 hours at this temperature and the pH maintained at 6.0-6.5 throughout using 8% sodium hydroxide solution (90 cm$^3$). The solution was cooled to room temperature and potassium chloride (225 g) added and stirred to dissolve. The pH was adjusted to 1.0 by the addition of 36% hydrochloric acid 87 cm$^3$) and the product collected by filtration and washed with 20% potassium chloride solution (25 cm$^3$).

The product thus obtained was reslurried in water (300 cm$^3$) and the ethanolamine (12 g) added. The solution was heated to 55°-60° C. for 7 hours, cooled to room temperature and 36% hydrochloric acid added to a pH of 7.2. A solution (300 cm$^3$) was obtained of the dye of Formula I except for the absence of the Y—N=N— group, in which $R^1$ is hydroxyethyl, $R^2$ is H and X is 3-ureido-4-(4-[2,5-disulphophenylazo]-2,5-dimethylphenylazo)-aniline.

Stage 3

The monoazo-amino dye 2-methoxy-4-(2,5-disulphophenylazo)-5-methylaniline (11.35 g, 0.025M, MI=454) was stirred in water (65 ml) and 8% sodium hydroxide solution added to pH 8.0. Sodium nitrite solution (2N, 13.0 cm$^3$) was added and the solution added to ice/water (65 g) and 36% hydrochloric acid (12.5 cm³) at 0°-2° C. over 10 minutes. The mixture was stirred a further 0.5 hours and excess nitrous acid removed using 10% sulphamic acid solution.

The diazo compound was then added over 0.25 hours at below 5° C. to the solution of the dye prepared in Stage 2 (0.025M). At the same time, 8% sodium hydroxide solution (35cm³) was added to maintain a pH value of 7.5-8.5. The coupling mixture was stirred for 2 hours at 0°-5° C. The dye was precipitated by the addition of anhydrous potassium acetate (150 g) and ethanol (900 cm³). The product was collected by filtration and washed with ethanol/water (3:1) and ethanol (3 × 250 cm³). The product was dried, re-dissolved in water (150 cm³) and precipitated by the addition of potassium acetate (75 g). The dye was removed by filtration, washed with 30% potassium acetate solution (80 cm³) and ethanol (2 × 100 cm³) and finally dried at 40° C. The dye obtained (24.7 g) was redissolved in distilled water and the solution subjected to dialysis in order to remove inorganic compounds. The resulting solution was evaporated to dryness at 50°-60° C. in vacuum to yield 17 g of Dye 2, i.e. the dye of Formula I wherein $R^1$ is hydroxyethyl, $R^2$ is H, X is 3-ureido-4-(4-[2,5-disulphophenylazol-2,5-dimethylphenylazo)-phen-1-ylamino and Y is Y is 2-methoxy-4-(2,5-disulphophenylazo)-5-methylphen-1-yl.

EXAMPLE 3

Stage 1

To a solution of the dye prepared in Stage 2 of Example 1 (0.01M) in water (100 g) at pH 6.5 and 0°-5° C., was added a solution of cyanuric chloride (1.85 g) in acetone (15 g) with vigorous agitation. The pH was maintained at 5-6 by the addition of 2M sodium hydroxide solution and the temperature at 0°-5° C. The reaction was adjudged to be complete when 1 equivalent of sodium hydroxide had been consumed.

To the solution so formed was added a solution of the dye formed in Stage 1 of Example 1 (0.01M) in water (50 g) at pH 7.5. The temperature of the solution was raised to 35°-40° C. and the pH maintained at 6-6.5 by the addition of 2M sodium hydroxide solution. The reaction was adjudged to be complete when 1 equivalent of sodium hydroxide had been consumed.

After cooling to room temperature, potassium acetate (15% w/v) was added followed by ethanol (450 g). The product was filtered off and washed with aqueous ethanol (1:4; 150 g) followed by ethanol (100 g).

Stage 2

The solid product from Stage 1 was added to water (100 g). To this solution was added ethanolamine (3 g) and the whole stirred at 55°-60° for 7 hours. After cooling to room temperature, potassium acetate (12.5% w/v) was added, followed by ethanol (2× volume of dye solution). The product was filtered off, washed with aqueous ethanol (1:1, 250 g) followed by ethanol (250 g).

The product so formed was dissolved in the minimum of water and subjected to dialysis. The resulting solution, free from inorganic compounds, was evaporated to dryness at 50°-60° C. in vacuum to yield the dye hereinbefore identified as Dye 3, i.e. the dye of Formula I wherein $R^1$ is hydroxyethyl; $R^2$ is H; X is 2-methoxy-4-(2,5-disulphophenylazo)-phen-1-ylamino and Y is 2-methoxy-4-(2,5-disulphophenylazo)-5-methylphen-1-yl, both as the potassium salt.

EXAMPLE 4

Stage 1

To a solution of 2-amino-3,6,8-naphthalene trisulphonic acid (0.02M) in water (700 g) at pH 7.0 and 0°-10° C., was added concentrated hydrochloric acid (50 g), followed slowly by 2M sodium nitrite solution (100 g). After 30 minutes from the completion of the addition, excess nitrous acid was destroyed with sulphamic acid. To this diazo suspension was added a solution of acetylgamma acid (0.2M) in water (400 g) and the pH adjusted to 7.0. After 1 hour the reaction was complete.

To this solution was added sodium hydroxide (125 g) and the solution refluxed for 2 hours, when hydrolysis was complete. The pH of the hot solution was adjusted to 7.0 and after stirring for 18 hours at room temperature the product was filtered.

Stage 2

The procedure of Example 3 was repeated using the product of Stage 1 of this Example in place of the product of Stage 1 of Example 1 to give the dye hereinbefore identified as Dye 4 i.e. the dye of Formula I in which $R^1$ is hydroxyethyl; $R^2$ is H; Y is 2-methoxy-4-(2,5-disulphophenylazo)-5-methylphen-1-yl and X is 6-sulpho-7-(3,6,8-trisulphonaphth-2-ylazo)-8-hydroxy-naphth-2-ylamino, both as the potassium salt.

EXAMPLE 5

Stage 1

To a solution of the monoazo dye, 4-(2,5-disulpho-2,5-dimethylphenylazo)-aniline (0.1M) in water (250 g) at pH 8-9, was added 2M sodium nitrite solution (52.5 g). This solution was added over 10 minutes to concentrated hydrochloric acid (50 g) and ice (250 g). The temperature was maintained at 0°-2° for 45 minutes, after which excess nitrous acid was destroyed by the addition of sulphamic acid.

This diazo solution was added over 15 minutes to a solution of acetyl-H-acid (0.11M) in water (200 g) and ice (200 g) at pH 9. The pH was maintained at 7.5-8.5 by the addition of sodium hydroxide solution (32% w/v). After a further 1.5 hours, salt (30% w/v) was added and the mixture was stirred for 18 hours to complete the precipitation of the product. The product was filtered off, washed with saturated brine (450 g) and dried at 40° C.

Stage 2

The product of Stage 1 (0.09M) was added to water (1500 g) and sodium hydroxide solution (32% w/v; 150 g). The resulting solution was heated to 70°-80° C. for 6 hours, maintaining the volume at 2000 ml throughout. Concentrated hydrochloric acid was added to reduce the pH to 8, followed by salt (25% w/v). The solution was then allowed to cool to room temperature over 18 hours and the product filtered off. It was washed with brine (25% w/v; 1000 g) and dried at 40° C.

Stage 3

To a solution of the dye formed in Stage 2 (0.01M) in water (125 g) at pH 7 and 0°-5° C., was added a solution of cyanuric chloride (2.0 g) in acetone (15 g). The temperature was maintained at 0°-5° C. by external cooling and the pH at 5-6 using 1M sodium hydroxide solution. After 1.5 hours the reaction was complete and the solution was rapidly filtered to remove any excess cyanuric chloride.

The pH of this solution was raised to 6-7 and a solution of the monoazo dye 1-(4-sulphophenyl)-3-carboxyl- 4-(2-sulpho-5-aminophenylazo)-pyrazol-5-one (0.01M) at pH 7 in water (50 g) was added. The resultant solution was warmed to 35°–40° C. and the pH held at 6–7 by the addition of 1M sodium hydroxide solution, over 18 hours.

Stage 4

To the solution Prepared in Stage 3 was added 6-aminohexanol (6.0 g) and the temperature raised to 60°–70° C. for 12 hours. The pH was adjusted to 7 and salt (30% w/v) added. The product was filtered off, washed with brine (20% w/v) (100 g) and pulled dry. The product was dissolved in the minimum of water at pH 7.5 and subjected to dialysis. The resulting solution, free from inorganic matter, was evaporated to dryness at 50°–60° C. in vacuum, to yield the dye hereinbefore identified as Dye 5 i.e. the dye of Formula I in which $R^1$ is 6-hydroxy-n-hexyl; $R^2$ is H; X is 3-sulpho-4-(1-[4-sulphophenyl]-3-carboxypyrazolin-5-on-4-onylazo)-phenylamino; and Y is 2,5-dimethyl-4-(2,5-disulphophenylazo)-phen-1-yl, both as the sodium salt.

EXAMPLE 6

The procedure of Example 5 was repeated, except that di-ethanolamine (5.2 g) was substituted for 6-aminohexanol in Stage 4, to produce the dye hereinbefore identified as Dye 6, i.e. the dye of Formula I in which X and Y are as in Dye 5 and $R^1$ and $R^2$ are both hydroxyethyl.

EXAMPLE 7

The procedure of Example 5 was repeated, except that morpholine (4.3 g) was substituted for 6-aminohexanol in Stage 4, to produce the dye hereinbefore identified as Dye 7, i.e. the dye of Formula I in which X and Y are as in Dye 5 and $NR^1R^2$ is morpholino.

EXAMPLE 8

The procedure of Example 5 was repeated, except that in Stage 4 3-(2-hydroxyethoxy)propylamine (6.0 g) was substituted for 6-aminohexanol in Stage 4 and the dye was precipitated with potassium acetate (40% w/v) instead of salt (30% w/v) and the product washed with potassium acetate solution (40% w/v; 100 g) prior to dialysis, to produce the dye hereinbefore identified as Dye 8, i.e. the dye of Formula I in which X and Y are as in Dye 5, $R^1$ is 3-(2-hydroxyethoxy)propyl and $R^2$ is H.

EXAMPLE 9

Stage 1

A solution of 11.7 g H-acid (0.03M) in 100 g water was prepared and adjusted to pH 7 with sodium hydroxide solution (2M). The temperature of the solution was lowered to <10°. A solution of 5.6 g cyanuric chloride in 40 g acetone was added to 100 g iced water and the resulting suspension added to the H-acid solution, keeping the temperature below 10°. The mixture was stirred for 1.5 hours at <10°, during which time the pH fell from 7 to 1.5 and a clear solution resulted. The solution was filtered and 7.6 g ethanolamine added. This solution was warmed to 40°, stirred for 1 hour and left to stir without heat overnight.

Stage 2

To a solution of 8.1 g 3-methyl-4-aminobenzenesulphonic acid (0.03M) in 200 g water at pH 7 was added 16 g of 2N sodium nitrite solution and the whole cooled to below 5°. To this solution was added 15 g 35% hydrochloric acid and the mixture stirred at <5° for 30 minutes after which excess nitrous acid was destroyed by the addition of 10% sulphamic acid solution.

Stage 3

The diazo solution prepared in Stage 2 was added to the solution of the H-acid derivative prepared in Stage 1, precooled to <5°, and the mixture stirred for 2 hours. Potassium acetate (20% w/v) was added and the product separated by filtration. It was washed with 100 g ethanol and redissolved in the minimum of distilled water. The solution was dialysed in Visking (Trade Mark) tubing until no further chloride ion could be detected in the effluent liquor. The dialysate was successively filtered through a Whatman GF/C filter and Pall Ultipor N66 (Registered Trade Mark) 0.8 and 0.45 micron membrane filters. The filtrate was evaporated to dryness under reduced pressure to yield 15.2 g of Dye 18, i.e. the dye of Formula I in which X is $NR^1R^2$, $R^1$ is hydroxyethyl, $R^2$ is H, M is sodium and Y is 2-methyl-4-sulphophen-1-yl (Na salt).

EXAMPLE 10

The procedure of Example 9 was repeated except for the replacement of the 3-methyl-4-aminobenzene sulphonic acid by the equivalent quantity of 2-naphthylamine-3,6,8-trisulphonic acid to prepare the dye hereinbefore identified as Dye 15, i.e. the dye of Formula 1 in which X, N, $R^1$ and $R^2$ are as in Example 9, and Y is 3,6,8-trisulphonaphth-2-yl.

EXAMPLE 11

The procedure of Example 9 was repeated except for the replacement of the 3-methyl-4-aminobenzene sulphonic acid by the equivalent quantity of 2-amino-5-methoxybenzene sulphonic acid to prepare the dye hereinbefore identified as Dye 16, i.e. the dye of Formula 1 in which X, N, $R^1$ and $R^2$ are as in Example 9, and Y is 2-sulpho-4-methoxyphen-1-yl.

EXAMPLE 12

The procedure of Example 9 was repeated except for the replacement of the 3-methyl-4-aminobenzene sulphonic acid by the equivalent quantity of 2-amino-5-methylbenzene sulphonic acid to prepare the dye hereinbefore identified as Dye 17, i.e. the dye of Formula 1 in which X, N, $R^1$ and $R^2$ are as in Example 9, and Y is 4-methyl-2-sulphophen-1-yl.

THE INK

The aforementioned water-soluble dye of Formula I and certain closely related dyes which contain less than three azo groups are adapted for use in an ink, particularly a writing or printing ink based upon water and/or a water-miscible organic solvent, such as an alkanol or glycol, and especially an ink suitable for ink-jet printing wherein the ink is ejected from an orifice of a recording head in the form of liquid droplets.

For recording on paper or the like with writing tools (fountain pen, felt pen, etc.), it is conventional to use an ink which is a solution of a dye in water or a water miscible organic solvent and an ink of similar composition is also used in ink-jet printing.

In ink-jet printing, droplets of ink are generated in various ways and deposited on a substrate to effect a record. A suitable ink comprises, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezo-electric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

An ink for any of the various types of ink-jet printing systems need to meet the following criteria:

(1) Physical properties of the ink, such as viscosity and surface tension, are each within a defined range.

(2) All solutes have good solubility in the ink medium to give solutions having good stability which do not plug the fine ejecting orifices (hereinafter referred to as "solution stability").

(3) The recording agent gives images of sufficient optical density.

(4) The ink does not change in physical properties or deposit solid matter during storage.

(5) Printing can be performed without a restriction on the nature of substrate on which a record is made.

(6) The ink exhibits a high rate of fixation.

(7) The ink gives images of good resolution and having good resistance to water, solvent (particularly alcohol), light, weather and abrasion.

However, images produced by conventional inks, particularly water-based inks, tend to form blots, dislocations or scratches, or to fade by water adhesion, mechanical friction, or exposure to light and an ink free from these drawbacks is an urgent requirement.

In addition to the above criteria, an ink for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye in accordance with Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye and a liquid medium, such as water, an organic solvent or a mixture thereof. The dye of the first feature of the present invention has especially good solution stability in the above-mentioned liquid medium, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5-20%, preferably 0.5-15%, and especially 1-10% by weight based on the total weight of the ink.

The present ink can contain, besides the hereinbefore defined dye of Formula I, other dyes selected from various types of known dyes such as direct dyes, acid dyes, and the like but preferably contain only dye in accordance with the first aspect of the present invention or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)-ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture of water, diethylene glycol and N-methyl-pyrrolidone.

The present ink preferably contains from 5–95%, preferably 10–80%, and especially 20–50%, by weight of water-soluble organic solvent based on the total weight of the ink.

Examples of specific inks in accordance with the second aspect of the present invention are:

| Ink | Dye No. (parts) | Liquid medium and other components (parts) |
| --- | --- | --- |
| 1 | 1 (3) | Water (62)<br>Ethylene glycol (39)<br>1,2,6-Hexanetriol (5) |
| 2 | 2 (4) | Water (61)<br>Glycerol (25)<br>Triethanolamine (10) |
| 3 | 3 (2) | Water (68)<br>2-Methoxy-2-ethoxy-2-ethoxyethanol (30)<br>Polyoxyethylated 4-nonylphenol (0.1) |
| 4 | 4 (3) | Water (72)<br>Propylene glycol (20)<br>Dimethylformamide (5) |
| 5 | 5 (5) | Water (50)<br>Diethylene glycol (25)<br>N-Methyl-2-pyrrolidone (20) |
| 6 | 6 (5) | Water (50)<br>Diethylene glycol (25)<br>N-Methyl-2-pyrrolidone (20) |
| 7 | 7 (3) | Water (52)<br>Diethylene glycol (30)<br>N-Methyl-2-pyrrolidone (15) |
| 8 | 8 (5) | Water (50)<br>Diethylene glycol (20)<br>N-Methyl-2-pyrrolidone (15)<br>Polyethylene glycol (MW 200) (10) |
| 9 | 9 (4) | Water (61)<br>Diethylene glycol (20)<br>1,3-Dimethyl-2-imidazolidinone (15) |
| 10 | 10 (3) | Water (64)<br>Ethylene glycol (30)<br>Polyethylene glycol (MW 200) (3) |
| 11 | 11 (4) | Water (56)<br>Diethylene glycol (30)<br>2-Methoxy-2-ethoxy-2-ethoxyethanol (10) |
| 12 | 12 (3) | Water (62)<br>Diethylene glycol (20)<br>1,3-Dimethyl-2-imidazolidinone (15) |
| 13 | 13 (5) | Water (50)<br>Diethylene glycol (25)<br>N-Methyl-2-pyrrolidone (20) |
| 14 | 14 (4) | Water (50)<br>Diethylene glycol (25)<br>N-Methyl-2-pyrrolidone (20) |
| 15 | 15 (3) | Water (57)<br>Ethyl alcohol (10)<br>Glycerol (30)<br>Sodium dehydroacetate (0.1) |
| 16 | 16 (6) | Water (50)<br>Diethylene glycol (25)<br>N-Methyl-2-pyrrolidone (20) |
| 17 | 17 (5) | Water (50)<br>Diethylene glycol (25)<br>N-Methyl-2-pyrrolidone (20) |
| 18 | 18 (3) | Water (67)<br>Diethylene glycol (30)<br>Methyl p-hydroxybenzoate (0.1) |
| 19 | 19 (6) | Water (50)<br>Diethylene glycol (25)<br>N-Methyl-2-pyrrolidone (20) |

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention in so far as it relates to inks is further illustrated with reference to the following Examples in which all parts and percentages are by weight unless otherwise indicated.

EXAMPLES 13

Eight inks were prepared, using the Dyes 1 to 4 and 15 to 18, as described in Examples 1 to 4 and 8 to 11 above, and the following ingredients:

| Dye | 5 parts |
|---|---|
| Diethylene glycol | 35 parts |
| Deionised water | 60 parts |

The above-mentioned inks were prepared by thorough mixing of the ingredients, filtering the solution under pressure through a Teflon filter (pore size: 1 micron) and degassing the filtered ink, in vacuo. For each of the inks the following five characteristics, $T_1$-$T_5$, were measured using a recording apparatus having an on-demand type of recording head (50u-diameter ejecting orifice, piezo-oscillator driving voltage 60 V, frequency 4 KHz). Each ink gave good results in each test.

$T_1$—Prolonged Storage Stability

Each ink was sealed separately in a glass container and stored at $-30°$ C. and at $60°$ C. for 6 months. In each case there was no appreciable separation of any insoluble matter or any change in physical properties and colour.

$T_2$—Ejection Stability

Each ink was subjected to continuous recording tests at room temperature, $5°$ C., and $40°$ C. for 24 hours. Each ink gave high quality images constantly throughout the test period at each temperature.

$T_3$—Ejection Responsiveness

Each ink was subjected to intermittent ejection at two-second intervals and ejection after standing for two months and each ink showed stable uniform recording without causing plugging of the orifice.

$T_4$—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
|---|---|
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

$T_5$—Fixing Properties for Recording Member

Images recorded on the above-mentioned three types of recording paper were rubbed with a finger 15 seconds after recording, and without forming any smudges or blots, indicating the excellent fixation properties of the images.

EXAMPLE 14

An element for transforming electric energy into thermal energy was prepared on an alumina substrate as follows.

A $SiO_2$ (lower) layer 5 microns thick was formed over the alumina substrate by sputtering and a 1000 A $HfB_2$ layer, as a heat generating resistor layer, and a 3000 A aluminum layer, as an electrode, were successively laid thereover. A heat generating resistor pattern having size of $50 \times 200$ microns was formed by selective etching of the aluminum layer. A $SiO_2$ layer 3500 A thick, as a protective (upper) layer, was then laid thereover. A print head was formed by bonding a glass plate on which grooves 50 microns wide and 50 microns deep had been engraved onto the $SiO_2$ protective layer in register with the etched pattern on the heat generating resistor. The tip surface of orifice was then polished so that the distance between the tip of heat generating resistor and the tip surface of orifice was 250 microns.

The print head was operated by applying printing signals of 40 V $\times 10^{-5}$ sec rectangular voltage pulses at a cycle of $2 \times 10^{-4}$ sec. The print head operated normally and without blockage for 160 hours using an ink having the following composition:

| Dye 2 (decomp'n temp: 280° C.) | 5 parts |
|---|---|
| Diethylene glycol | 25 parts |
| N-methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye 2 with a dye of Formula I in which $R^1$ and $R^2$ are both hydroxyethyl, Y is phenyl and X is 4-sulpho-7-(2-sulpho-4-methoxyphenylazo)-8-hydroxynaphth-2-ylamino.

EXAMPLE 15

The print head was operated similarly to Example 14 using inks having the same compositions except that Dye 2 was replaced by the stated quantity of each of the dyes listed in Table 1, by applying printing signals of 50 V $\times 10^{-5}$ sec rectangular voltage pulses at a cycle of $2 \times 10^{-4}$ sec. The resulting satisfactory operating periods are shown in Table 1.

TABLE 1

| Composition of Ink | | Satisfactory |
|---|---|---|
| Dye No. | Content (wt %) | Operating Period (hours) |
| 1 | 5 | 120 |
| 1 | 6 | 160 |
| 2 | 6 | 180 |
| 2 | 7 | 170 |
| 3 | 7 | 120 |
| 3 | 5 | 120 |
| 4 | 5 | 150 |
| 15 | 5 | 120 |
| 16 | 6 | 140 |
| 17 | 5 | 150 |
| 18 | 5 | 170 |
| 18 | 6 | 130 |

EXAMPLES 16 to 23

Inks having the compositions defined in Table 2 were prepared and tested for properties $T_1$-$T_5$, in the same manner as in Example 13.

The results indicated that all these inks have good characteristics, and particularly excellent recording performance, fixation properties and sharpness of image.

TABLE 2

| Example | Dye No. (parts) | Liquid medium and other components (parts) |
|---|---|---|
| 16 | 1 (3) | Water (62) |
|  |  | Ethylene glycol (39) |
|  |  | 1,2,6-hexanetriol (5) |
| 17 | 2 (4) | Water (61) |
|  |  | Glycerol (25) |
|  |  | Triethanolamine (10) |
| 18 | 18 (3) | Water (67) |
|  |  | Diethylene glycol (30) |
|  |  | Methyl p-hydroxybenzoate (0.1) |
| 19 | 3 (2) | Water (68) |
|  |  | 2-Methoxy2-ethoxy-2-ethoxyethanol (30) |
|  |  | Polyoxyethylated 4-nonylphenol (0.1) |
| 20 | 4 (3) | Water (72) |
|  |  | Propylene glycol (20) |
|  |  | Dimethylformamide (5) |
| 21 | 15 (3) | Water (57) |
|  |  | Ethyl alcohol (10) |
|  |  | Glycerol (30) |
|  |  | Sodium dehydroacetate (0.1) |
| 22 | 15 (3) | Water (62) |
|  |  | Diethylene glycol (20) |
|  |  | 1,3-Dimethyl-2-imidazolidinone (15) |
| 23 | 18 (3) | Water (52) |
|  |  | Diethylene glycol (30) |
|  |  | N-Methyl-2-pyrrolidone (15) |

EXAMPLE 24

Each of the inks containing a dye of Formula I described in Examples 9 to 23 was charged separately into a commercial fountain pen and a record was made on plain paper. Each record showed no blotting of image and a high rate of absorption of ink.

We claim:

1. An ink for ink jet recording comprising a water soluble dye, of the formula:

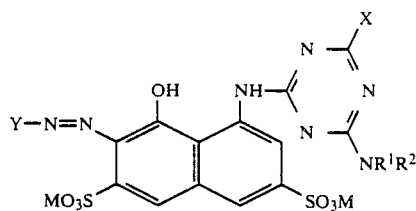

wherein
$R^1$ is $(C_aH_{2a}O)_m(C_bH_{2b}O)_nH$,
$R^2$ is H or —$(C_aH_{2a}O)_m(C_bH_{2b}O)_nH$, or $R^1$ and $R^2$ together with the nitrogen atom form a morpholine ring a and b are different and are from 2 to 6
m is from 1 to 10;
n is from 0 to 9;
M is H, ammonium, or a monovalent metal;
X is (i) $NR^1R^2$, (ii) $NR^3R^4$, in which $R^3$ and $R^4$ are each independently selected from H, alkyl and aryl, or (iii) a monoazo chromophore derived from a benzene or naphthalene diazo component and a benzene, naphthalene or mono-heterocyclic coupling component or a bisazo chromophore derived from benzene or naphthalene diazo components and benzene or naphthalene coupling components, in which the monazo or bisazo chromophore is linked to the triazine group through a group —$NR^5$— in which $R^5$ is selected form H, $C_{1-4}$-alkyl and phenyl; and Y is (i) a phenyl or naphthyl nucleus carrying at least one $SO_3M$ group or (ii) a monoazo chromophore derived from a benzene, naphthalene or monoheterocyclic diazo component and a benzene or naphthalene coupling component carrying at least one $SO_3M$ group; provided that the dye contains one or from three to five azo groups.

2. An ink for ink jet recording comprising a water soluble black dye, of the formula:

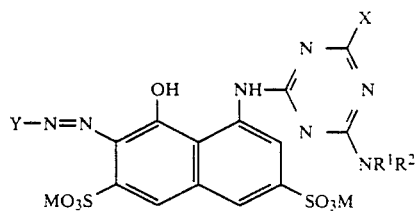

wherein
$R^1$ is $(C_aH_{2a}O)_m(C_bH_{2b}O)_nH$,
$R^2$ is H or $(C_aH_{2a}O)_m(C_bH_{2b}O)_nH$, or
$R^1$ and $R^2$ together with the nitrogen atom form a morpholine ring
a and b are different and are from 2 to 6
m is from 1 to 10;
n is from 0 to 9;
M is H, ammonium, or a monovalent metal;
X is a monoazo chromophore derived from a benzene or naphthalene diazo component and a benzene, naphthalene or monoheterocyclic coupling component or a bisazo chromophore derived from benzene or naphthalene diazo components and benzene or naphthalene coupling components, in which the monoazo or bisazo chromophore is linked to the triazine group through a group —$NR^5$— in which $R^5$ is selected from H, $C_{1-4}$-alkyl and phenyl; and Y is a monoazo chromophore derived from a benzene, naphthalene or monoheterocyclic diazo component and a benzene or naphthalene coupling component carrying at least one $SO_3M$ group; provided that the dye contains from three to five azo groups.

3. An ink according to claim 1 wherein $NR^1R^2$ is selected from hydroxyethyamino, di(hydroxyethyl)amino and morpholino.

4. An ink according to claim 1 wherein X is the residue of a mono- or dis-azo chromophore comprising benzene or naphthalene diazo and coupling components optionally substituted by one or more groups selected from $C_{1-4}$-alkyl, $C_{1-4}$-alkoxy, ureido, $C_{1-4}$-alkylcarbonylamino, mono- and di-$C_{1-4}$-alkylamino, phenylamino, nitro, halogen, carboxylate, sulphonate and, hydroxy.

5. An ink according to claim 1 wherein Y is the residue of a benzene or naphthalene diazo component carrying at least one sulphonate group, $SO_3M$, and optionally carrying one or more groups selected from $C_{1-4}$-alkyl, $C_{1-4}$alkoxy, $C_{1-4}$alkylcarbonylamino, ureido, mono- and di-$C_{1-4}$-alkylamino, phenylamino, nitro, halogen, carboxylate, sulphonate and hydroxy.

6. An ink according to claim 1 wherein Y is the residue of a mono- or dis-azo chromophore comprising benzene or naphthalene diazo and coupling components and carrying at least one sulphonate group, $SO_3M$ and optionally carrying one or more other substituents selected from $C_{1-4}$-alkyl, $C_{1-4}$-alkoxy, $C_{1-4}$-alkylcarbonylamino, mono- and di-$C_{1-4}$-alkylamino, phenylamino, nitro, ureido, halogen, carboxylate, sulphonate and hydroxy.

7. An ink according to claim 1 carrying at least five sulphonate groups.

8. The ink according to claim 1 wherein M is potassium, Y is 2-methoxy-4-(2,5-disulphophenylazo)-5-methylphenyl (K salt), X is 5-hydroxy-6-(2-sulphophenylazo)-7-sulphonaphth-2-ylimino (K salt), $R^1$ is hydroxyethyl and $R^2$ is H.

9. The ink according to claim 1 wherein M is potassium, Y is 2-methoxy-4-(2,5-disulphophenylazo)-5-methylphenyl (K salt), X is 3-ureido-4-(4-[2,5-disulphophen-1-ylazo]-2,5-dimethylphen-1-ylazo)-phenylimino (K salt), $R^1$ is hydroxyethyl and $R^2$ is H.

10. The ink according to claim 1 wherein $R^1$ is hydroxyethyl, $R^2$ is H, X is $NR^1R^2$, M is sodium and Y is 3,6,8-trisulphonaphth-2-yl, (Na salt).

11. The ink according to claim 1 wherein $R^1$ is hydroxyethyl, $R^2$ is H, X is $NR^1R^2$, M is sodium and Y is 2-methyl-4-sulphophenyl, (Na salt).

12. An ink comprising a dye in accordance with claim 1 suitable for a recording system of the type in which an ink is ejected from a small orifice in the form of droplets directed towards a substrate on which an image is to be formed.

13. An ink according to claim 1 wherein the dye is dissolved in water of a mixture of water and a water-soluble organic solvent.

14. An ink according to claim 13 wherein the water-soluble organic solvent is a polyhydric alcohol.

15. An ink according to claim 1 containing from 0.5% to 20% by weight of the dye.

* * * * *